(12) United States Patent
Matsuyama

(10) Patent No.: US 9,074,918 B2
(45) Date of Patent: Jul. 7, 2015

(54) FUEL MEASUREMENT SYSTEM

(71) Applicant: HORIBA, Ltd., Kyoto (JP)

(72) Inventor: Takashi Matsuyama, Kyoto (JP)

(73) Assignee: HORIBA, Ltd., Kyoto (JP)

( * ) Notice: Subject to any disclaimer, the term of this patent is extended or adjusted under 35 U.S.C. 154(b) by 0 days.

(21) Appl. No.: 13/900,135

(22) Filed: May 22, 2013

(65) Prior Publication Data

US 2014/0123742 A1   May 8, 2014

(30) Foreign Application Priority Data

Nov. 2, 2012   (JP) .................................. 2012-243111

(51) Int. Cl.
| | |
|---|---|
| *G01F 1/84* | (2006.01) |
| *G01F 15/00* | (2006.01) |
| *G05D 7/00* | (2006.01) |
| *G07C 5/00* | (2006.01) |
| *F01P 7/00* | (2006.01) |
| *G01F 15/02* | (2006.01) |

(52) U.S. Cl.
CPC *G01F 1/84* (2013.01); *G01F 15/00* (2013.01); *G01F 15/02* (2013.01); *G05D 7/00* (2013.01); *G07C 5/00* (2013.01); *F01P 7/00* (2013.01); *F01P 2060/10* (2013.01)

(58) Field of Classification Search
CPC ............. G01F 1/84; G01F 9/00; G01F 15/00; G01F 15/02; F02M 37/0052; F02M 37/0047; F02M 65/003; F02D 33/003; G05D 7/00; F01P 7/00; F01P 2060/10

USPC ......................................................... 73/114.52
See application file for complete search history.

(56) References Cited

U.S. PATENT DOCUMENTS

| 5,469,747 | A  | * | 11/1995 | Carlisle et al. ........... 73/861.355 |
|---|---|---|---|---|
| 5,708,201 | A  | * | 1/1998  | Kaub ......................... 73/114.42 |
| 7,231,816 | B2 | * | 6/2007  | Christian et al. ........... 73/114.42 |
| 7,311,005 | B2 | * | 12/2007 | Wiesinger et al. .............. 73/714 |
| 7,600,417 | B2 | * | 10/2009 | Paradise ..................... 73/114.42 |
| 7,677,093 | B2 | * | 3/2010  | Christian et al. ........... 73/114.52 |
| 7,784,359 | B2 | * | 8/2010  | Lin et al. .................. 73/861.354 |
| 7,930,115 | B2 | * | 4/2011  | Gonia et al. ..................... 702/50 |
| 2006/0277982 | A1 | * | 12/2006 | Christian et al. ................ 73/112 |
| 2014/0116107 | A1 | * | 5/2014  | Weinstein et al. ............. 73/1.31 |
| 2014/0123624 | A1 | * | 5/2014  | Minto ........................ 60/39.281 |

FOREIGN PATENT DOCUMENTS

| JP | 2004-361392 | 12/2004 |
|---|---|---|
| JP | 2006329990 | 12/2006 |
| JP | 2011-501123 | 1/2011 |
| JP | 2012-181770 | 9/2012 |

* cited by examiner

*Primary Examiner* — Freddie Kirkland, III
(74) *Attorney, Agent, or Firm* — Brooks Kushman P.C.

(57) ABSTRACT

A fuel measurement system for measuring a fuel consumption amount of an engine, intended to reduce a measurement error of a Coriolis flowmeter to thereby improve measurement accuracy and reproducibility of a fuel consumption amount. The system includes: a Coriolis flowmeter provided on a fuel supply path for supplying a fuel to the engine to measure a flow rate of the fuel in the fuel supply path; and a temperature control mechanism provided in an upstream side of the Coriolis flowmeter on the fuel supply path to control a temperature of the fuel flowing into the Coriolis flowmeter.

4 Claims, 1 Drawing Sheet

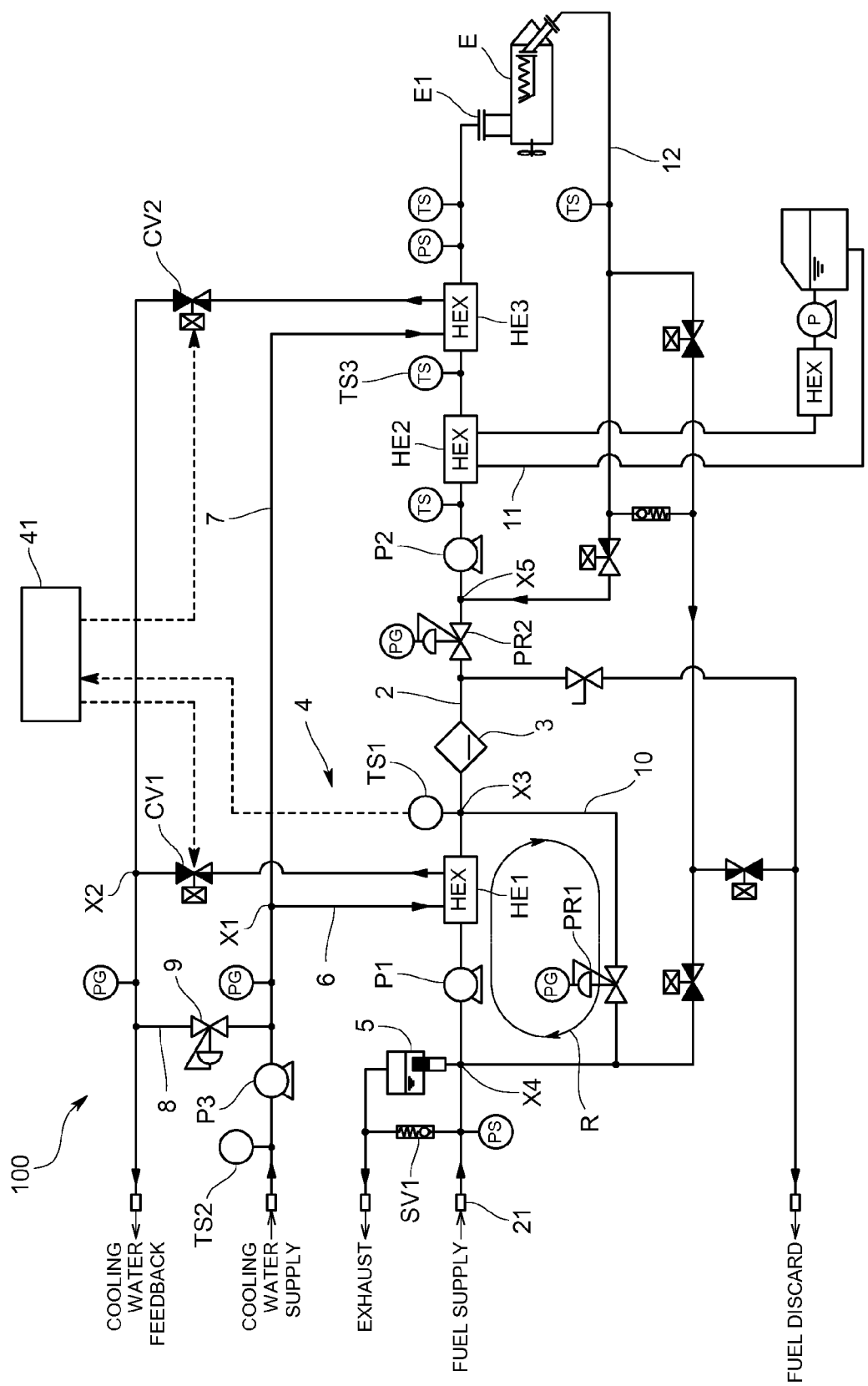

FUEL MEASUREMENT SYSTEM

CROSS-REFERENCE TO RELATED APPLICATION

This application claims priority to JP Application No. 2012-243111, filed on Nov. 2, 2012, the disclosure of which is incorporated in its entirety by reference herein.

TECHNICAL FIELD

The present invention relates to a fuel measurement system for measuring a fuel consumed by an internal combustion engine.

BACKGROUND ART

As a conventional fuel measurement system, there has been considered a measurement system for measuring a consumption amount of a fuel consumed by an engine using a Coriolis flowmeter.

In this arrangement, since a Coriolis flowmeter can directly measure a mass flow rate of the fuel without being affected by a temperature and pressure of the fuel compared to other types of flowmeters, a Coriolis flowmeter is increasingly used in a fuel consumption amount measurement system in recent years.

However, in the case where the fuel is in a low flow rate region such as a case of measuring a fuel consumption amount of an engine, for example, in a state of idling, measurement values of the Coriolis flowmeter are varied, and there arises a problem that reliability in measuring a fuel consumption amount cannot be obtained.

As a cause of variation in measurement values of the Coriolis flowmeter in a low flow rate region, there is considered a change in elastic force of a pipe (flow tube) inside the Coriolis flowmeter due to a temperature change of the fuel.

Although there is also a measurement system in which a temperature correction of a measurement value is performed by a temperature sensor provided inside a Coriolis flowmeter, this temperature correction is performed using a default value (default value) and therefore the correction accuracy may not be obtained sufficiently due to an instrumental error of the Coriolis flowmeter in some cases.

An error due to the change in elastic force is in a degree of 0.0002 kg/h per 1° C. For example, in the case where a fuel of a large flow rate in a degree of 100 kg/h is measured, since an error value to a measurement value is extremely small, the error can be ignored. Whereas, in the case where a fuel of a small flow rate in a degree of, e.g., 10 kg/h is measured, the error value is large to a measurement value and this error cannot be ignored from the viewpoint of measurement accuracy.

It is noted that, although the configuration provided with the heat exchanger in an upstream side of the Coriolis flowmeter in the system of Japanese Patent JP2006-329990A, since the configuration is not provided with a temperature sensor, this merely indicates that the fuel is cooled in the upstream side of the Coriolis flowmeter.

SUMMARY OF INVENTION

Technical Problem

Therefore, the present invention has been made in order to solve the problems at a stroke and its essential object is to reduce a measurement error of a Coriolis flowmeter to thereby improve measurement accuracy and reproducibility of a fuel consumption amount.

Solution to Problem

That is, a fuel measurement system according to the present invention is intended to measure a fuel consumed by an internal combustion engine, wherein the system includes: a Coriolis flowmeter provided on a fuel supply path for supplying a fuel to the internal combustion engine to measure a flow rate of the fuel in the fuel supply path; and a temperature control mechanism provided in an upstream side of the Coriolis flowmeter on the fuel supply path to control a temperature of the fuel flowing into the Coriolis flowmeter.

With this configuration, since a mechanism for controlling a temperature of the fuel flowing into the Coriolis flowmeter to be, for example, constant is provided in the upstream side of the Coriolis flowmeter, a measurement error due to a temperature change of the fuel in the Coriolis flowmeter can be reduced. Thus, the measurement accuracy and reproducibility of a fuel flow rate can be improved irrespective of a flow rate range of the fuel or without depending on a temperature correction using a temperature sensor and consequently the measurement accuracy and reproducibility of a fuel consumption amount can be improved.

As a specific configuration of the temperature control mechanism, it is preferable that the temperature control mechanism includes: a heat exchanger performing a heat exchange between a cooling liquid flowing through a cooling liquid flow path provided with a flow rate regulating valve and the fuel flowing in the upstream side of the Coriolis flowmeter in the fuel supply path; a temperature sensor provided inside the Coriolis flowmeter or in the upstream side of the Coriolis flowmeter on the fuel supply path; and a control unit adapted to control an opening degree of the flow rate regulating valve using a detected temperature detected by the temperature sensor to thereby control the flow rate of the cooling liquid flowing in the heat exchanger.

With this configuration, a valve opening degree of the flow rate regulating valve can be feedback-controlled based on a deviation between a target temperature of the fuel flowing into the Coriolis flowmeter and a detection temperature detected by the temperature sensor and consequently the temperature of the fuel flowing into the Coriolis flowmeter can be controlled. At this time, in the case where the temperature sensor is provided inside the Coriolis flowmeter, the temperature of the fuel can be more accurately controlled to be a target temperature constantly. Also, even in the case where the temperature sensor is provided between the heat exchanger and the Coriolis flowmeter in the fuel supply path, the temperature of the fuel can be more accurately controlled to be a target temperature constantly.

It is preferable that the fuel measurement system further includes a circulation flow path branched from a position between the heat exchanger and the Coriolis flowmeter in the fuel supply path and joining to the upstream side of the heat exchanger to form a circulation path in association with the fuel supply path, wherein the heat exchanger is provided between the branch point and the confluence of the circulation flow path on the fuel supply path.

With this configuration, since the circulation path is formed by the circulation flow path and the temperature-controlled fuel flowing in the circulation flow path is mixed with the fuel prior to be temperature-controlled, the temperature of the fuel can be easily kept constant without depending only on ability of the heat exchanger. In addition, since the heat exchanger is provided between the branch point and the confluence of the circulation flow path and the flow rate in the circulation path becomes large in this portion, the temperature of the fuel can be easily made constant.

Advantageous Effects of Invention

According to the present invention configured as described above, it becomes possible to reduce a measurement error accompanied by a temperature change of the fuel in the Coriolis flowmeter by controlling a temperature of the fuel flowing into the Coriolis flowmeter to be constant, and therefore the measurement accuracy and reproducibility of the fuel flow rate can be accordingly improved and consequently the measurement accuracy and reproducibility of a fuel consumption amount consumed by the internal combustion engine can be improved.

BRIEF DESCRIPTION OF DRAWINGS

FIG. 1 is a schematic diagram of a fuel consumption amount measurement system of the present embodiment.

DESCRIPTION OF EMBODIMENTS

The following describes an embodiment of a fuel measurement system according to the present invention referring to the accompanying drawings.

A fuel measurement system 100 of the present embodiment is a fuel consumption amount measurement system for measuring a consumption amount of a fuel consumed by an engine E. As shown in FIG. 1, the fuel consumption amount measurement system includes: a fuel supply path 2 for supplying a fuel to the engine E; a Coriolis flowmeter 3 for measuring a flow rate of the fuel flowing in the fuel supply path 2; and a temperature control mechanism 4 for controlling a temperature of a fuel flowing into the Coriolis flowmeter 3 to be constant. In this arrangement, the fuel consumption amount measurement system 100 may include calculating equipment (not shown) calculating a consumption amount of a fuel consumed by the engine E based on a mass flow rate of the fuel obtained by the Coriolis flowmeter 3. This calculating equipment may be configured of a control unit 41 to be described later.

The fuel supply path 2 has its one end provided with a fuel introduction port 21 and the other end connected to a fuel supply port E1 of the engine E. In the fuel supply path 2, from the upstream side thereof, there are provided the fuel introduction port 21, a first pump P1 which is a conveying pump, a first heat exchanger HE1 for cooling the fuel, the Coriolis flowmeter 3, a second pump P2 which is a suction pump, a second heat exchanger HE2 for heating the fuel, a third heat exchanger HE3 for cooling the fuel, and the like.

In the fuel supply path 2, a safety valve SV1 is provided in the upstream side of the first pump P1. This safety valve SV1 is adapted to release a part of the fuel to the outside in order to reduce an inflow pressure in the case where the fuel of a pressure equal to or higher than a predetermined value, for example, equal to or higher than 250 kPa flows in. Moreover, an air-bubble removing mechanism 5 for removing air bubbles in the fuel is provided between the safety valve SV1 and the first pump P1 in the fuel supply path 2. By this air-bubble removing mechanism 5, air bubbles can be removed from the fuel immediately before the fuel flows in the first pump P1.

The temperature control mechanism 4 includes the first heat exchanger HE1, a fuel temperature sensor TS1 provided in the upstream side of the Coriolis flowmeter 3 and a control unit 41 for controlling a flow rate of cooling water serving as cooling liquid flowing through the first heat exchanger HE1.

The first heat exchanger HE1 is adapted to perform heat exchange between cooling water flowing through a first cooling liquid flow path 6 (referred to as "first cooling water flow path 6" hereinafter) which is provided with a flow rate regulating valve CV1 and a fuel flowing in the upstream side of the Coriolis flowmeter 3 on the fuel supply path 2. In this arrangement, in the first cooling water flow path 6 for supplying the cooling water to the first heat exchanger HE1, a third cooling water flow path 7 is formed to be branched for supplying cooling water serving as cooling liquid to the third heat exchanger HE3.

In the upstream side of the first heat exchanger HE1 in the first cooling water flow path 6, a circulation pump P3 is provided for circulating the cooling water. This circulation pump P3 is provided in the upstream side of a branch point X1 of the third cooling water flow path 7 in the first cooling water flow path 6 and has a function of not only circulating the cooling water through the first cooling water flow path 6 but also circulating the cooling water through the third cooling water flow path 7. Further, in the upstream side of the circulation pump P3 in the first cooling water flow path 6, a cooling water temperature sensor TS2 is provided for detecting a temperature of the cooling water. This cooling water temperature sensor TS2 is adapted to detect whether or not the temperature of the cooling water flowing into the first and third cooling water flow paths 6 and 7 is in a predetermined temperature range (for example, in a range of 5° C. to 40° C.).

Moreover, in the downstream side of the first heat exchanger HE1 in the first cooling water flow path 6, the flow rate regulating valve CV1 is provided for regulating the flow rate of the cooling water in the first cooling water flow path 6. This flow rate regulating valve CV1 is provided in the upstream side of a confluence X2 of the third cooling water flow path 7 in the first cooling water flow path 6 and an opening degree of the valve is controlled by the control unit 41 as to be described later.

The fuel temperature sensor TS1 is provided between the first heat exchanger HE1 and the Coriolis flowmeter 3 in the fuel supply path 2 so as to detect a temperature of the fuel. It is noted here that the fuel temperature sensor TS1 may be configured to detect a temperature of the fuel by detecting a temperature of a pipe constituting the fuel supply path 2, or may be configured to be provided inside the fuel supply path 2 so as to directly detect a temperature of the fuel.

The control unit 41 is configured of an exclusive and general-purpose computer including a CPU, a memory, an AD converter and the like and consequently the opening degree of the flow rate regulating valve CV1 provided in the first cooling water flow path 6 is controlled based on a temperature control program stored in an internal memory thereof.

In specific, in the case where a detected temperature (temperature of the fuel) obtained by the fuel temperature sensor TS1 is higher or lower than a predetermined reference temperature, the control unit 41 controls the valve opening degree of the flow rate regulating valve CV1 so that the detected temperature obtained by the fuel temperature sensor TS1 becomes the reference temperature. The control unit 41 performs the temperature control of the fuel, for example, in a manner as follows.

(1) In the case where a detected temperature obtained by the fuel temperature sensor TS1 is lower than the reference temperature, the control unit 41 increases the valve opening degree of the flow rate regulating valve CV1 under the condition that the detected temperature obtained by the fuel temperature sensor TS1 is raised by increasing the flow rate of the cooling water.

(2) In the case where the detected temperature obtained by the fuel temperature sensor TS1 is lower than the reference temperature, the control unit 41 decreases the valve opening degree of the flow rate regulating valve CV1 under the condition that the detected temperature obtained by the fuel temperature sensor TS1 is lowered by increasing the flow rate of the cooling water.

(3) In the case where the detected temperature obtained by the fuel temperature sensor TS1 is higher than the reference temperature, the control unit 41 increases the valve opening degree of the flow rate regulating valve CV1 under the condition that the detected temperature obtained by the fuel temperature sensor TS1 is lowered by increasing the flow rate of the cooling water.

(4) In the case where a detected temperature obtained by the fuel temperature sensor TS1 is higher than the reference temperature, the control unit 41 decreases the valve opening degree of the flow rate regulating valve CV1 under the condition that the detected temperature obtained by the fuel temperature sensor TS1 is raised by increasing the flow rate of the cooling water.

Furthermore, the control unit 41 also controls a valve opening degree of a flow rate regulating valve CV2 provided in the third cooling water flow path 7 connected to a third heat exchanger HE3 based on a detected temperature obtained by a temperature sensor TS3 provided in the upstream side of the third heat exchanger HE3. Moreover, the control unit 41 acquires detection signals from a temperature sensor and pressure sensor provided in the flow paths constituting the measurement system 100 and controls valves and pumps provided in these flow paths.

Furthermore, it may be considered that the predetermined reference temperature is determined based on an ambient temperature. More specifically, in the case where the ambient temperature is equal to or lower than a predetermined temperature such as, e.g., 25 degrees, the valve opening degree of the flow rate regulating valve CV1 is controlled so that the temperature of the fuel becomes constant at the predetermined temperature (i.e., 25 degrees) which is set as the reference temperature. In the case where the ambient temperature is equal to or higher than a predetermined temperature such as, e.g., 25 degrees, the valve opening degree of the flow rate regulating valve CV1 is controlled so that the temperature of the fuel becomes constant at the ambient temperature which is used as the reference temperature.

A bypass path 8 which bypasses the first heat exchanger HE1 and the flow rate regulating valve CV1 is provided between the upstream side of the first heat exchanger HE1 (i.e., downstream side of the circulation pump P3) in the first cooling water flow path 6 and the downstream side of the first heat exchanger HE1 in the first cooling water flow path 6. Specifically, the bypass path 8 is connected between the upstream side of the branch point X1 of the first cooling water flow path 6 and the third cooling water flow path 7, and the downstream side of the confluence X2 of the first cooling water flow path 6 and the third cooling water flow path 7.

In this bypass path 8, there is provided a differential pressure regulator 9 for maintaining a differential pressure between the upstream side and downstream side of the first heat exchanger HE1 to be constant. This differential pressure regulator 9 is adapted to release the cooling water in the upstream side of the first cooling water flow path 6 to the downstream side of the first heat exchanger HE1 through the bypass path 8 at the time of the pressure rising of the first cooling water flow path 6 which is caused in such a case where the flow rate regulating valve CV1 is closed.

In this fuel consumption amount measurement system 100, there is provided a circulation flow path 10 for forming a circulation path R which is branched from a point between the first heat exchanger HE1 and the Coriolis flowmeter 3 in the fuel supply path 2 and joins with the upstream side of the first heat exchanger HE1.

A pressure regulator PR1 is provided in this circulation flow path 10 to regulate the pressure of the fuel flowing in the circulation flow path 10. The fuel temperature-controlled by the first heat exchanger HE1 flows in the circulation flow path 10 and this circulation flow path 10 configures that the temperature-controlled fuel is returned back to the upstream side of the first heat exchanger HE1. Thus, since the temperature-controlled fuel flowing in the circulation flow path 10 is mixed with the fuel before the fuel is temperature-controlled, the temperature of the fuel can be easily kept constant without relying only on the ability of the first heat exchanger HE1.

In this circuit configuration of the circulation flow path 10, the first heat exchanger HE1 and the first pump P1 are provided between the branch point X3 and the confluence X4 of the circulation flow path 10 on the fuel supply path 2. Thus, since the first heat exchanger HE1 and the first pump P1 are provided in portions where the flow rate becomes large in the circulation path R, the temperature of the fuel can be easily kept constant.

Referring to other circuit configurations, the second heat exchanger HE2 is adapted to heat the fuel controlled to be a constant temperature by the first heat exchanger HE1 and to perform a heat exchange between heating liquid (hot water) flowing through a heating liquid flow path 11 and the fuel flowing through the fuel supply path 2.

Further, there is provided a fuel return path 12 for returning the fuel remaining without being consumed by the engine E to the upstream side of the second pump P2 on the fuel supply path 2. In specific, this fuel return path 12 is connected between the downstream side of the Coriolis flowmeter 3 and the upstream side of the second pump P2 in the fuel supply path 2. A pressure regulator PR2 is provided between the Coriolis flowmeter 3 and a connecting point X5 of the fuel return path 12, and the flow rate of the fuel flowing through the pressure regulator PR2 corresponds to a consumption amount of the fuel consumed by the engine E.

According to the fuel consumption amount measurement system 100 according to the present embodiment configured as described above, since a mechanism for controlling the temperature of the fuel flowing into the Coriolis flowmeter 3 to be constant is provided in the upstream side of the Coriolis flowmeter 3, a measurement error due to a temperature change of the fuel in the Coriolis flowmeter 3 can be reduced. Thus, the measurement accuracy and reproducibility of a fuel consumption amount can be improved even in a low flow rate region of the fuel without depending on a temperature correction using a temperature sensor.

It is noted that the present invention should not be limited to the above embodiment. For example, in the present embodiment, although the fuel temperature sensor TS1 is provided between the first heat exchanger HE1 and the Coriolis flowmeter 3 on the fuel supply path 2, the temperature sensor provided in other location such as inside the Coriolis flowmeter 3 may be used. In this case, it is not necessary to provide a temperature sensor separately and the device configuration can be simplified. Moreover, since the temperature of the pipe inside the Coriolis flowmeter 3 is measured, the temperature of the fuel can be controlled more accurately. In addition, it may be also configured such that, considering an operating temperature of the first pump P1 as a temperature of the fuel, the temperature of the fuel is controlled using the operating temperature.

It may be also possible to reverse the arrangement of the first heat exchanger HE1 and the first pump P1. Even in this case, it is preferable that the first heat exchanger HE1 and the first pump P1 are disposed between the branch point X3 and the confluence X4 of the circulation flow path 10.

In addition, the present invention should not be limited to the above embodiment, and various modifications are of course possible within the scope unless departing from the intended spirit thereof.

DESCRIPTION OF REFERENCE NUMERALS

100 . . . Fuel consumption amount measurement system
E . . . Internal combustion engine
2 . . . Fuel supply path
3 . . . Coriolis flowmeter
4 . . . Temperature control mechanism
CV1 . . . Flow rate regulating valve
6 . . . Cooling water flow path
HE1 . . . First heat exchanger
TS1 . . . Fuel temperature sensor
41 . . . Control unit
11 . . . Circulation flow path
X3 . . . Branch point
X4 . . . Confluence

What is claimed is:

1. A fuel measurement system for measuring a fuel consumed by an internal combustion engine comprising:
    a Coriolis flowmeter provided on a fuel supply path for supplying a fuel to the internal combustion engine to measure a flow rate of the fuel in the fuel supply path; and
    a temperature control mechanism provided in an upstream side of the Coriolis flowmeter on the fuel supply path to control a temperature of the fuel flowing into the Coriolis flowmeter, and including
        a heat exchanger performing a heat exchange between a cooling liquid flowing through a cooling liquid flow path provided with a flow rate regulating valve and the fuel flowing in the upstream side of the Coriolis flowmeter in the fuel supply path,
        a temperature sensor provided inside the Coriolis flowmeter or in the upstream side of the Coriolis flowmeter on the fuel supply path, and
        a control unit adapted to control an opening degree of the flow rate regulating valve using a detected temperature detected by the temperature sensor to control the flow rate of the cooling liquid flowing in the heat exchanger.

2. The fuel measurement system according to claim 1 further comprising a circulation flow path branched from a position between the heat exchanger and the Coriolis flowmeter in the fuel supply path and joining to the upstream side of the heat exchanger to form a circulation path in association with the fuel supply path, wherein
    the heat exchanger is provided between the branch point and the confluence of the circulation flow path on the fuel supply path.

3. The fuel measurement system according to claim 1, wherein the control unit is further adapted to control the opening degree of the flow rate regulating so that the detected temperature obtained by the fuel temperature sensor becomes a predetermined constant reference temperature.

4. The fuel measurement system according to claim 3, wherein the reference temperature is determined according to an ambient temperature.

* * * * *